Dec. 11, 1928.
A. R. CURTIS
1,695,230
SUPPORT AND BEARING FOR GYRATING SHAFTS
Filed April 23, 1923
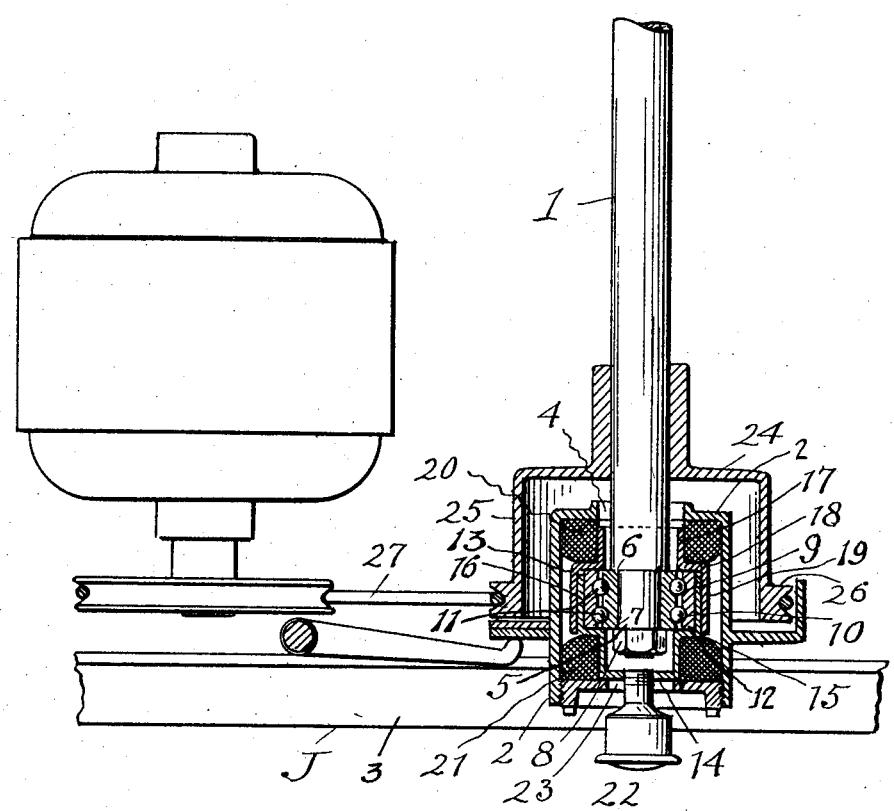
Inventor
Arthur R. Curtis
by
Thurston Kwiat Hudson
attys.

Patented Dec. 11, 1928.

1,695,230

UNITED STATES PATENT OFFICE.

ARTHUR R. CURTIS, OF CLEVELAND, OHIO.

SUPPORT AND BEARING FOR GYRATING SHAFTS.

Application filed April 23, 1923. Serial No. 633,973.

This invention relates to a support and bearing for a vertically disposed gyrating shaft in which the bearing is yieldably supported to permit the shaft to have a gyrating movement.

The present invention is applicable to various types of centrifugal or other machines which employ a vertically disposed gyrating shaft, the device shown herein being employed in connection with the centrifugal laundry dryer shown in United States Letters Patent No. 1,659,391 granted to me February 14, 1928.

An object of the present invention is to provide a yielding support and bearing for the gyrating shaft which offers a minimum of frictional resistance to rotation of the shaft and also permits the shaft to have a limited tilting movement upon its support.

A further object is to provide means for retaining a suitable lubricant in the bearing which will prevent the lubricant supplied to the bearing from coming in contact with the buffers which yieldably support the bearing.

The following description and accompanying drawing set forth in detail certain means for accomplishing the above and other objects of the invention, the disclosed means, however, constituting but one of the various mechanical forms in which the principle of the invention may be employed.

The accompanying drawing shows a vertical section through the bearing and the casing in which the bearing is yieldably supported, the vertical shaft 1 being the gyrating shaft which is supported in a yieldably mounted bearing at its lower end and carries at its upper end the extractor basket which is located within a suitable fixed curb as shown in my patent above referred to. The lower end of the shaft 1 is supported within a fixed casing 2 which is mounted upon the base 3 of the machine, the casing 2 having an opening 4 in the top thereof through which the shaft 1 extends and which is of a diameter sufficiently greater than the diameter of the shaft to permit the shaft to gyrate or wabble somewhat while rotating. The shaft 1 has a lower end portion 5 offset to a lesser diameter and forming a shoulder 6 against which is fitted an inner race ring 7 which fits tightly upon the reduced portion of the shaft and is held in place by means of a nut 8 screwed onto the lower end of the reduced portion 5 of the shaft. An outer race ring 9 surrounds the inner race ring 7 and two rows of bearing balls 10 and 11 are held in complemental grooves formed upon the outer face of the inner ring 7 and the inner face of the outer ring 9 respectively. The shaft bearing is enclosed within a casing formed by lower and upper sheet metal cups 12 and 13, the cups 12 and 13 being in telescopic engagement with each other and tightly fitting over the exterior of the outer race ring 9. The lower cup 12 is formed at its lower closed end with a portion 14 of a diameter less than the external diameter of the outer race ring 9 and enclosing the nut 8, which projects beneath the bearing, and with a shoulder 15 which engages with the bottom edge of the race ring 9, the upper end portion 16 of the cup 12 having a tight fit against the outer side of the ring 9. The upper cup 13 has a sleeve portion 17 which surrounds the shaft 1 above the bearing and is slightly spaced therefrom to permit the shaft to rotate freely therein and with a shoulder 18 which bears against the upper edge of the race ring 9, the lower enlarged portion 19 being tightly fitted over and squeezed down upon the enlarged portion 16 of the lower cup 12. A buffer collar 20 formed of rubber or other elastic material is fitted upon the sleeve 17 of the upper cup and fits tightly within the upper portion of the fixed casing 2 and extends from the top of the casing to the shoulder 18 of the upper cup. A similar buffer collar 21 fits tightly within the bottom portion of the fixed casing 2, surrounds the reduced lower portion 14 of the lower cup and bears against the shoulder 15. The lower face of the upper collar 20 and the upper face of the lower collar 21 are tapered toward the center so that they engage with the inner portions of the shoulders 15 and 18. The tapered engaging faces of the buffer collars provide a more yielding support for the shaft bearing and offer less resistance to the tilting movement of the bearing during the operation of the shaft. A grease cup 22 is secured to the lower end of the lower cup 12 and extends through an opening 23 in the bottom of the fixed casing 2, the opening 23 being of sufficient diameter to permit the grease cup to move laterally a limited distance in any direction. A suitable lubricant can be supplied to the bearing by means of the grease cup 22 and lubricant so supplied to the bearing will be retained within the inner casing formed by the cups 12 and 13 and cannot escape into the space surrounding the bearing within the fixed casing 2. This is important since the lubricant would have a deleterious effect upon the rubber buffers 20 and 21, causing them to soon lose their resiliency and wearing qualities. A pulley 24 is fixed to the shaft 1 above the fixed casing 2 and has a depending cylindrical skirt 25 surrounding the fixed casing, the skirt 25 being provided with a grooved flange 26 at its lower edge adapted to receive a suitable driving belt 27 by means of which the shaft 1 is driven.

Having described my invention, I claim:

1. In a device of the character described, the combination with a gyrating shaft, of a bearing for supporting said shaft, comprising an externally grooved inner race ring, and an internally grooved outer race ring surrounding the inner race ring and balls interposed between said rings and seated in the grooves thereof for supporting the inner ring and shaft within the outer ring, a fixed casing enclosing the bearing, said casing having a tubular body portion and end walls, one of said end walls having an opening through which the shaft extends, one of said end walls being adjustable toward and from the other, a lubricant casing within the fixed casing and enclosing said bearing, said lubricant casing having an outwardly offset portion within which the outer race ring fits, said outwardly offset portion forming with the remainder of the lubricant casing buffer receiving shoulders, and buffers of elastic material disposed on said shoulders between the lubricant casing and the end walls of the fixed casing.

2. In a bearing of the character described, the combination with a gyrating shaft, of a single ball bearing for supporting said shaft, said bearing comprising an externally grooved race ring fixed to the shaft, an internally grooved outer race ring surrounding the inner race ring and balls interposed between said rings and seated in the grooves thereof for supporting the inner ring and shaft within the outer ring, a fixed casing enclosing the bearing, said casing having a tubular body portion and end walls, one of said end walls having an opening through which the shaft extends, a lubricant casing within the fixed casing and enclosing said bearing, said lubricant casing being formed of two cup shaped sheet metal stampings, each having an enlarged inner end portion secured upon the outer race ring and an outer end portion of reduced diameter, one of said stampings having an opening in the outer end thereof through which the shaft extends, and buffer rings of elastic material interposed between the enlarged portion of the lubricant casing and the opposite end walls of the fixed casing.

3. A support and bearing for a gyrating shaft comprising a fixed outer casing having an opening in the top thereof to receive the shaft, a bearing for the lower end portion of the shaft within said casing, an inner casing enclosing said bearing, said inner casing having an enlarged portion fitting over the bearing, a sleeve at the top surrounding the shaft and a closed lower end portion of reduced diameter, buffer collars of elastic material surrounding said sleeve and reduced lower end of the inner casing and fitting between the enlarged portion of the inner casing and the top and bottom walls of the outer casing, and means for supplying lubricant to the interior of the inner casing.

4. In a bearing of the character described, the combination with a gyratory shaft having a portion of reduced diameter at its lower end, a support and bearing for said shaft comprising a groove race ring secured to the reduced portion of the shaft, an outer grooved race ring surrounding the race ring on the shaft and balls positioned in the grooves of the ring, a casing enclosing the bearing comprising separable upper and lower sections, each of said sections having an enlarged portion extending over the outer race ring, the upper of the sections having a reduced sleeve portion surrounding the shaft above the bearing and the lower of the sections having a portion of reduced diameter beneath the bearing, a fixed casing having an opening in its top through which the shaft extends said fixed casing enclosing the said bearing and its casing and buffer collars surrounding the sleeve of the upper section and the reduced lower end of the lower section and interposed between the enlargd portions of the sections and the top and bottom of the fixed casing.

5. In a bearing of the character described, the combination with a gyratory shaft, of a ball bearing for the lower end thereof comprising an inner ball race fixed to the shaft, an outer ball race surrounding the inner race and balls interposed between said ball races, a casing enclosing the bearing comprising upper and lower cups, one of the cups fitting tightly over the outer ball race and the other cup fitting tightly over the portion of the first cup which surrounds said outer ball race, a fixed casing having an opening in its top to receive said shaft, said fixed casing enclosing the said bearing and its casing, and buffers of elastic material interposed between said bearing enclosing casing and the top and bottom of the fixed casing.

6. In a bearing of the character described, the combination with a gyratory shaft having a portion of reduced diameter at its lower end, a support and bearing for said shaft comprising a grooved race ring secured to the reduced portion of the shaft, an outer grooved race ring surrounding the race ring on the shaft and balls positioned in the grooves of the rings, a casing enclosing the bearing comprising a cup shaped sheet metal cup having its upper open end offset to a greater diameter than the lower portion thereof and fitting tightly over the outer race ring and an upper sheet metal cup having a sleeve portion surrounding the shaft above the bearing and a lower portion offset to a greater diameter fitting tightly over the portion of the lower cup surrounding the race ring, a fixed casing having an opening in its top through which the shaft extends, and buffer collars surrounding the sleeve of the upper cup and the reduced lower end of the lower cup and interposed between the enlarged portions of the cups and the top and bottom of the fixed casing.

7. In a device of the character described, the combination with a gyratory shaft, of a bearing for supporting the shaft comprising an externally grooved inner race ring fixed to the shaft adjacent an end thereof, an outer internally grooved race ring surrounding the inner ring and balls interposed between the rings and seated in the grooves thereof, a lubricant casing enclosing the bearing and forming a support for the outer race ring, said casing being formed of upper and lower sections, one section having an opening through which the shaft extends and the other enclosing the end of the shaft adjacent the bearing, and means for clamping the sections of said casing together and for yieldably supporting the casing comprising a fixed casing having a tubular wall surrounding the lubricant casing and upper and lower end walls one of which is adjustable toward and from the other and buffers of elastic material clamped between the said upper and lower end walls of the fixed casing and the upper and lower sections of said lubricant casing.

In testimony whereof, I hereunto affix my signature.

ARTHUR R. CURTIS.